United States Patent
Kiran et al.

(10) Patent No.: US 10,579,480 B1
(45) Date of Patent: Mar. 3, 2020

(54) FAST HYPER-V PROTECTION USING PARALLEL SAVE STREAMS

(71) Applicant: EMC IP Holding Company LLC, Hopkinton, MA (US)

(72) Inventors: MV Kiran, Bangalore (IN); Manjunath Jagannatha, Bangalore (IN); Ravi Shankar Panem, Bangalore (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 314 days.

(21) Appl. No.: 15/721,447

(22) Filed: Sep. 29, 2017

(51) Int. Cl.
*G06F 16/00* (2019.01)
*G06F 11/14* (2006.01)
*G06F 9/455* (2018.01)
*G06F 16/188* (2019.01)

(52) U.S. Cl.
CPC ...... *G06F 11/1464* (2013.01); *G06F 9/45558* (2013.01); *G06F 16/188* (2019.01); *G06F 2009/45583* (2013.01); *G06F 2009/45595* (2013.01); *G06F 2201/815* (2013.01)

(58) Field of Classification Search
CPC .............. G06F 2201/84; G06F 16/188; G06F 11/1451; G06F 11/1458
See application file for complete search history.

(56) References Cited

U.S. PATENT DOCUMENTS

| | | | |
|---|---|---|---|
| 7,107,385 B2 * | 9/2006 | Rajan | G06F 3/0605 711/4 |
| 7,334,094 B2 * | 2/2008 | Fair | G06F 16/10 711/161 |
| 8,117,168 B1 * | 2/2012 | Stringham | G06F 11/1451 707/646 |

\* cited by examiner

*Primary Examiner* — Cheryl Lewis
(74) *Attorney, Agent, or Firm* — Womble Bond Dickinson (US) LLP (57) ABSTRACT

One embodiment is related to a method for backing up a virtual disk file using parallel save streams, comprising: retrieving a block allocation table (BAT) of the virtual disk file; splitting the BAT into a plurality of split BATs; assigning data blocks of the virtual disk file to plexes based on the plurality of split BATs, wherein each plex corresponds to one of the plurality of split BATs; and streaming the plexes to a backup apparatus in parallel, wherein each plex occupies one stream.

21 Claims, 6 Drawing Sheets

FAST HYPER-V PROTECTION USING PARALLEL SAVE STREAMS

FIELD OF THE INVENTION

Embodiments of the disclosure are related to electronic devices, and more particularly, to a method, apparatus, and system for backing up a virtual disk file using parallel save streams.

BACKGROUND

As the size of virtual environments grows, the size of backup window will increase manifold. Traditional backup methodologies fail to meet the Recovery Time Objectives (RTOs) and Recovery Point Objectives (RPOs) associated with today's business needs. Even if there are solutions offered to do seamless backup even during business time, this leads to contention of compute resource with the actual business application.

A backup window is the time required to perform and finish a backup, which is directly related to the backup process itself. Typically, depending on the size of data to be backed up, down time (sometimes in the hours) has to be identified in a business process. Backups, being a necessary activity, would lead to definite shrink in productive hours. The snapshot capability at various levels, such as at the volume level or the application level, may reduce down time by enabling backups even during production. But still there is a continuous endeavor to swiftly perform backups of large data sets (ranging in terabytes "TBs" or even more). Further, it has been observed that with conventional backup technologies data is typically sent in a single stream, which would result in under usage of network capabilities.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention are related to a method for backing up a virtual disk file using parallel save streams, comprising: retrieving a block allocation table (BAT) of the virtual disk file; splitting the BAT into a plurality of split BATs; assigning data blocks of the virtual disk file to plexes based on the plurality of split BATs, wherein each plex corresponds to one of the plurality of split BATs; and streaming the plexes to a backup apparatus in parallel, wherein each plex occupies one stream.

Figure 1:
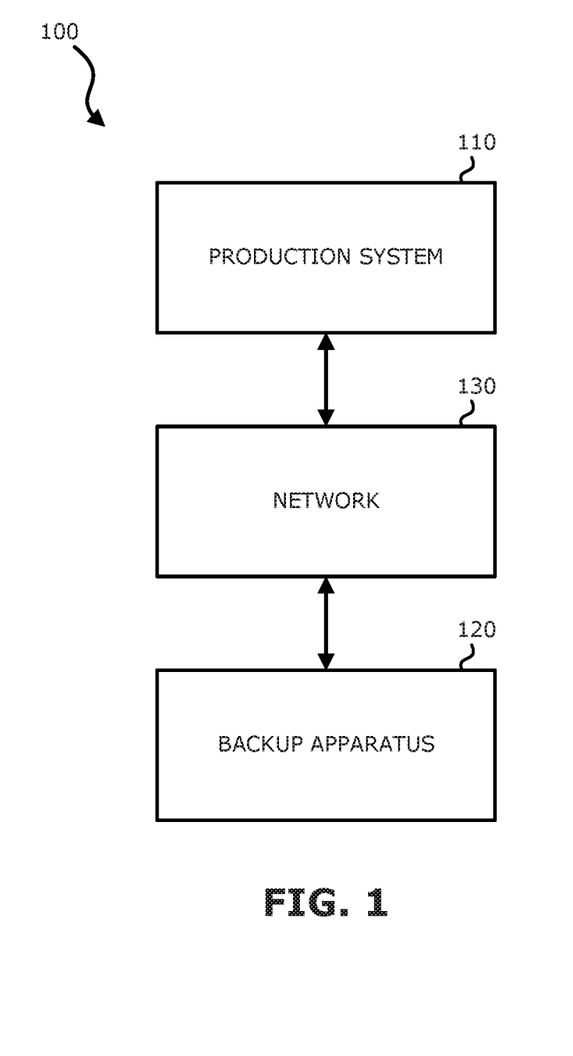
FIG. 1 is a block diagram illustrating an example environment in which embodiments of the invention may be practiced.

Referring to FIG. 1, a block diagram illustrating an example environment 100 in which embodiments of the invention may be practiced is shown. The environment 100 may comprise a production system 110 and a backup apparatus 120 (e.g., a backup system such as a Dell EMC Data Domain system), both of which are connected to a network 130 and can communicate through the network 130. In one embodiment, the production system 110 may host one or more virtualized environments that host production applications (e.g., web applications, etc.).

Common virtual environments (e.g., Microsoft Hyper-V or VMWare ESXi) may use file formats such as Hyper-V Virtual Hard Disk (VHDX) or Virtual Machine Disk (VMDK) to represent virtual disks. The backbone of protecting these virtualized environments is the backing up of the virtual disk files. Though there may be other associated configuration files, the virtual disk files represent the main data that needs to be protected. Therefore, virtual disk files residing in the production system 110 may be backed up to the backup apparatus 120 periodically or from time to time so as to protect these files against inadvertent data losses.

These virtual disk formats may support differencing disk chains, where, for example, a block allocation table (BAT) is used to specify the physical file offset for each block in the VHDX format. The equivalent of the BAT in the VMDK format is called a Grain Table. Hereinafter the term BAT may be used to refer to any structured data with a similar function in a virtual disk format.

A known technique named block based backup greatly improves backup time over a file level backup. Details regarding the block based backup technique can be found in Balasubramanian et al., U.S. Pat. No. 8,738,870, issued May 27, 2014, incorporated herein by reference, and Balasubramanian et al., U.S. Pat. No. 8,898,407, issued Nov. 25, 2014, incorporated herein by reference. However, even with block based backup, data is streamed sequentially, resulting in poor utilization of network resources.

Figure 2:
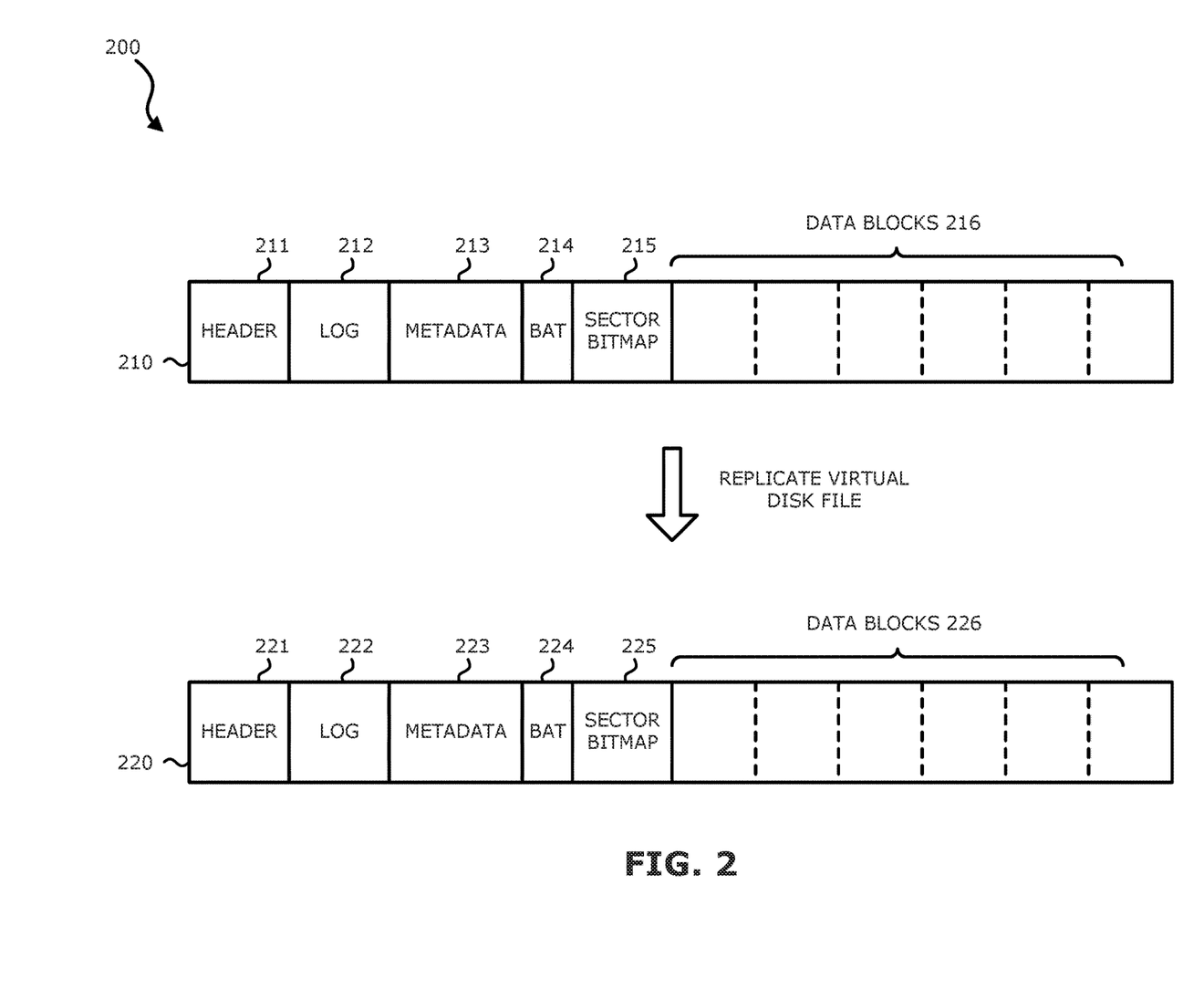
FIG. 2 is a block diagram illustrating a conventional method for backing up a virtual disk file.

Referring to FIG. 2, a block diagram illustrating a conventional method 200 for backing up a virtual disk file is shown. The virtual disk file 210 is a source file on the production system 110, and the virtual disk file 220 is a target file on the backup apparatus 120. With a conventional back up method, the source virtual disk file 210 is replicated to the backup apparatus 120 serially with a single network stream. Once the replication is completed, a target virtual disk file 220 identical to the source virtual disk file 210 will have been created on the backup apparatus 120. Thus, each of the source file 210 and the target file 220 contains a header section 211, 221, a log 212, 222, a metadata section 213, 223, a BAT 214, 224, a sector bitmap 215, 225, and data blocks 216, 226. The conventional serial replication technique may not fully utilize computer and network resources, and therefore may be slow. In other words, the conventional serial replication technique may lead to large backup windows.

Figure 3:
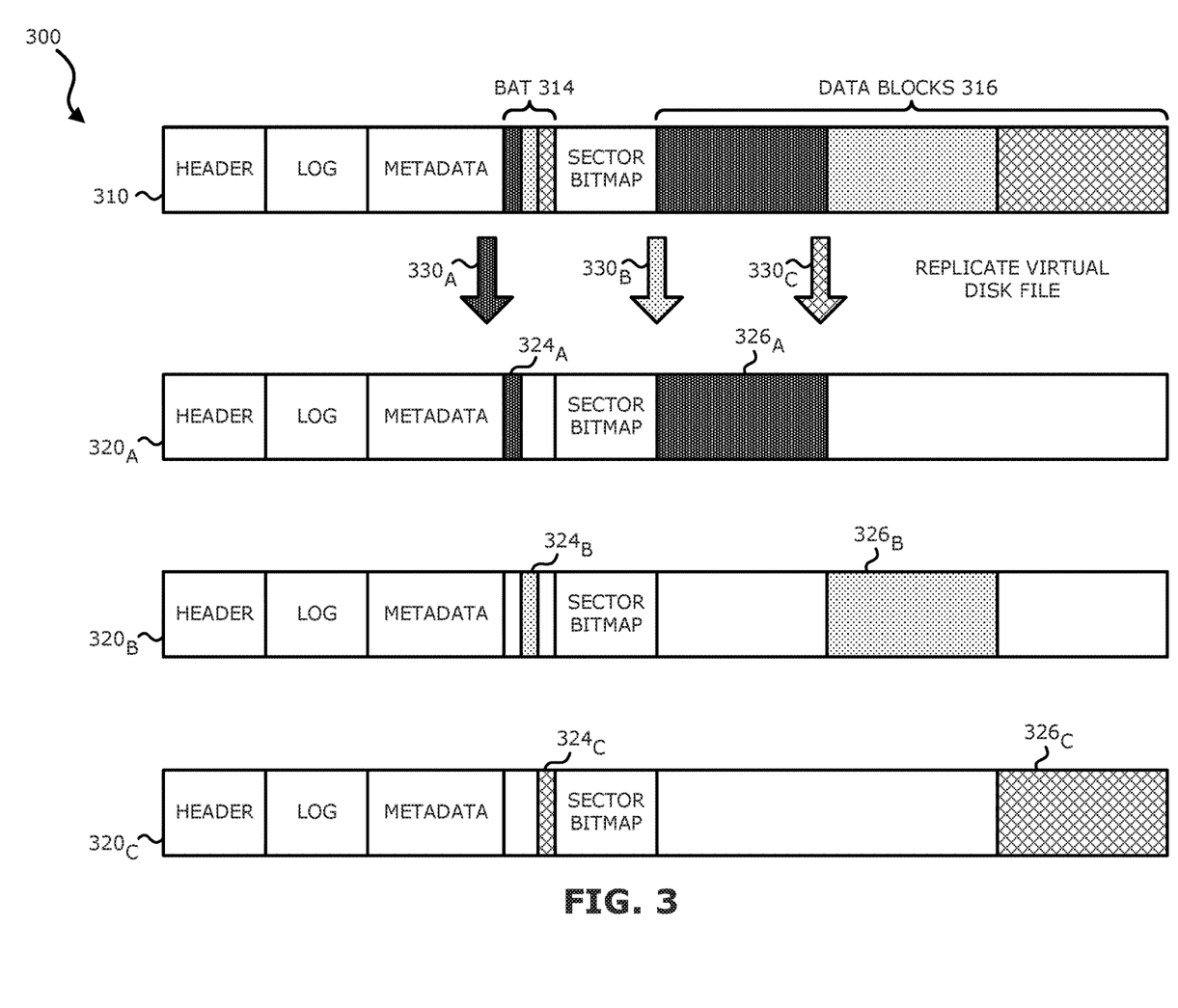
FIG. 3 is a block diagram illustrating an example method for backing up a virtual disk file using parallel save streams, according to one embodiment of the invention.

Referring to FIG. 3, a block diagram illustrating an example method 300 for backing up a virtual disk file using parallel save streams, according to one embodiment of the invention, is shown. The BAT 314 for the virtual disk file 310 may be split to create a set of split BATs 324, the number of split BATs 324 being equal to the number of streams 330 to be sent in parallel. Based on the split BATs 324, the data blocks 316 may be replicated to the backup apparatus in parallel network streams 330 as separate plexes, each plex occupying its own stream 330. The plexes may be equal in size, and each plex may be made up of data referred to by its respective split BAT 324. In particular, each plex stream is embedded in a differencing disk file payload. One of the plexes may correspond to a parent disk. Therefore, a differencing disk chain may be maintained across all the plexes. Each plex with the exception of the last plex shares its stream location with the next plex, and each plex with the exception of the parent plex embeds the stream location of the previous plex within its Parent Locator Entry (PLE) (PLE is a metadata entry of the differencing virtual disk file, and is used to identify the parent of a given differencing virtual disk file). Therefore, once the replication is completed, a set of differencing virtual disk files 320 will have been saved on the backup apparatus. The number of the differencing virtual disk files 320 is equal to the number of split BATs 324. Each differencing virtual disk files 320 contains data blocks 326 that correspond to part of the data blocks 316 of the virtual disk file 310. The set of differencing virtual disk files 320, in combination, contain all the same data as the virtual disk file 310 on the production system.

Therefore, the last differencing disk 320C on the backup apparatus, when mounted, would refer to its predecessors 320B, 320A and present a backup of the entire volume 310. In one embodiment, the differencing virtual disk files 320 may be merged to create a single disk image (saveset). This may take place in a deduplicated storage system (e.g., a Dell EMC Data Domain system).

Figure 4:
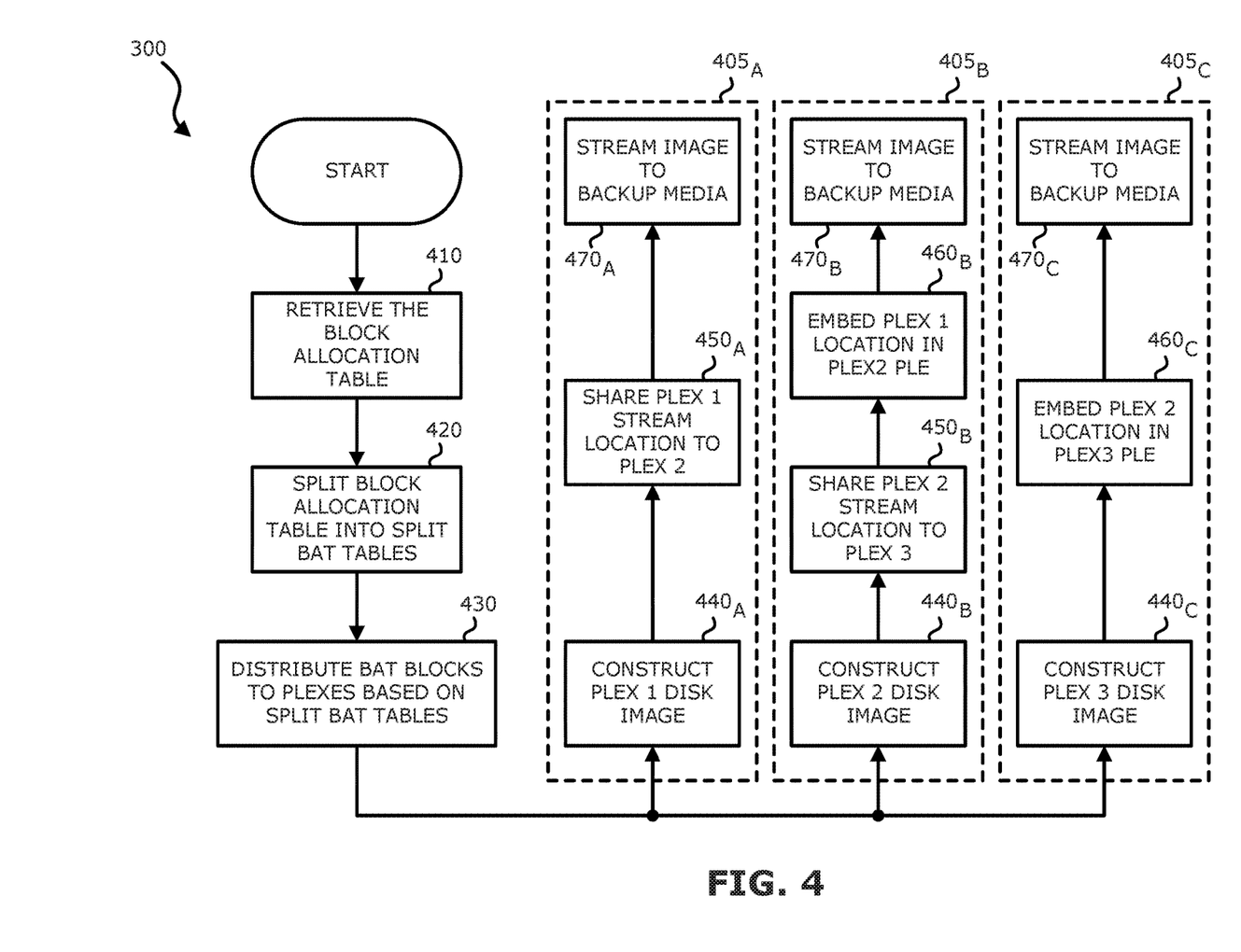
FIG. 4 is a flowchart illustrating an example method for backing up a virtual disk file using parallel save streams, according to one embodiment of the invention.

Referring further to FIG. 4, a flowchart illustrating an example method 300 for backing up a virtual disk file using parallel save streams, according to one embodiment of the invention, is shown. At block 410, the BAT of the virtual disk file may be retrieved. At block 420, the BAT may be split into split BATs, the number of split BATs being equal to the number of network streams intended. At block 430, data blocks may be distributed to plexes 405 based on the split BATs, each plex 405 corresponding to one split BAT. Thereafter, at blocks 440, in parallel, the plex images may be constructed. Further, at blocks 450 and 460, each plex with the exception of the last plex shares its stream location with the next plex, and each plex with the exception of the parent plex embeds the stream location of the previous plex within its PLE. At block 470, in parallel, plexes may be streamed to the backup apparatus, each plex occupying one stream. At the backup apparatus, the received plex image may be saved as a differencing virtual disk file.

It should be appreciated that although three plexes are illustrated in FIGS. 3 and 4, the invention is not limited by the number of plexes or streams utilized, as long as there are two or more streams/plexes. The split and stream technique described above may be used for both backup and recovery operations, speeding up both activities. It should be appreciated that the backup speed does not increase monotonically with the number of plexes: once the utilization of computer and network resources is saturated, increasing the number of plexes further does not further improve the backup speed.

Figure 5:
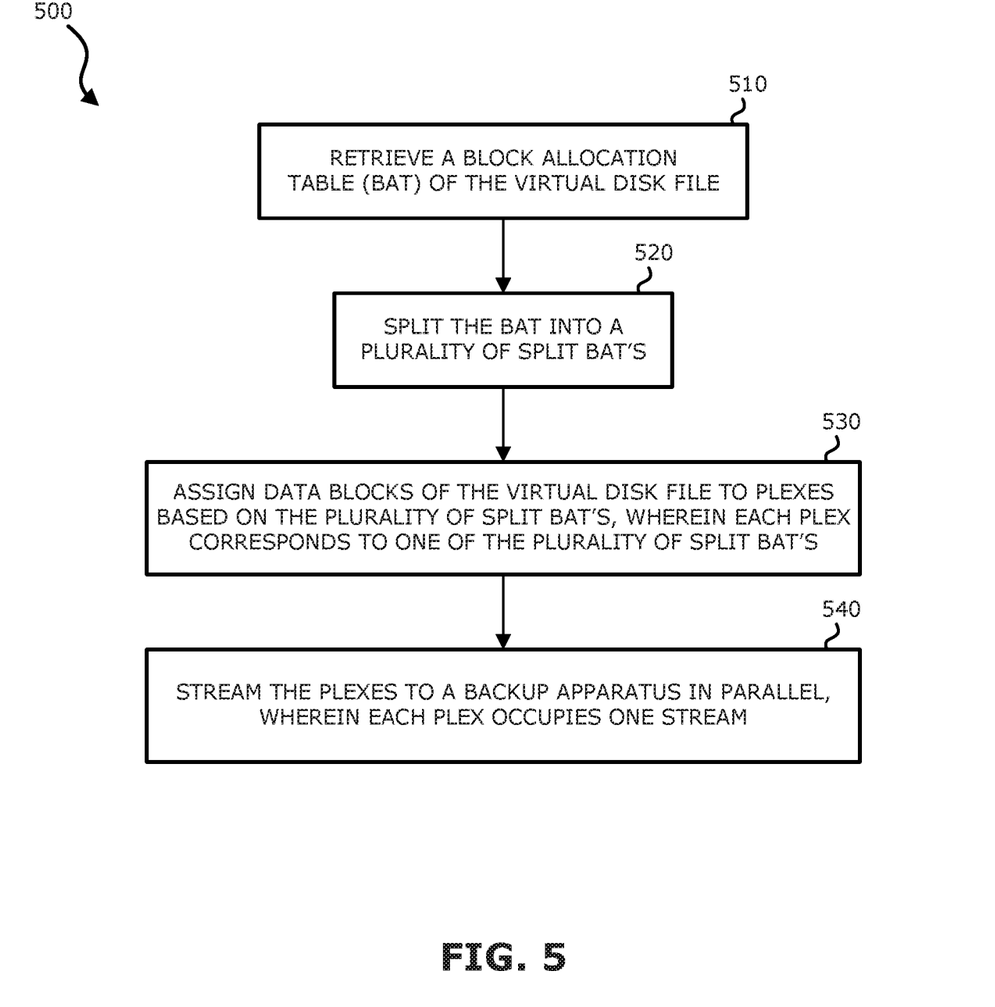
FIG. 5 is a flowchart illustrating an example method for backing up a virtual disk file using parallel save streams, according to one embodiment of the invention.

Referring to FIG. 5, a flowchart illustrating an example method 500 for backing up a virtual disk file using parallel save streams, according to one embodiment of the invention, is shown. At block 510, a BAT of the virtual disk file may be retrieved. The BAT may specify physical file offset for each block in the virtual disk file. At block 520, the BAT may be split into a plurality of split BATs. At block 530, the data blocks of the virtual disk file may be assigned to plexes based on the plurality of split BATs, wherein each plex corresponds to one of the plurality of split BATs. The plexes may be equally sized. At block 540, the plexes may be streamed to a backup apparatus in parallel, wherein each plex occupies one stream. The plexes may be saved on the backup apparatus as differencing virtual disk files. Further, each plex with the exception of the last plex shares its stream location with the next plex, and each plex with the exception of the parent plex embeds the stream location of the previous plex within its PLE. In other words, the differencing virtual disk files on the backup apparatus form a differencing virtual disk file chain. Moreover, the differencing disk images may be merged into a single disk image. The backup apparatus may be a deduplicated backup system.

Methods 300, 500 may be performed by processing logic that includes hardware (e.g. circuitry, dedicated logic, etc.), software (e.g., embodied on a non-transitory computer readable medium), or a combination thereof. For example, methods 300, 500 may be performed by processors 1501 of FIG. 6. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, embodiments of the invention are related to backing up data of a virtual disk file to a backup apparatus using a plurality of parallel save streams. A significant improvement of the back up speed may be achieved. The computer and network resources may be more effectively utilized for the backup task, reducing the backup window. The techniques described herein may be utilized with any type of backup apparatus, e.g., EMC Dell Data Domain, Advanced File Type Devices, etc.

Figure 6:
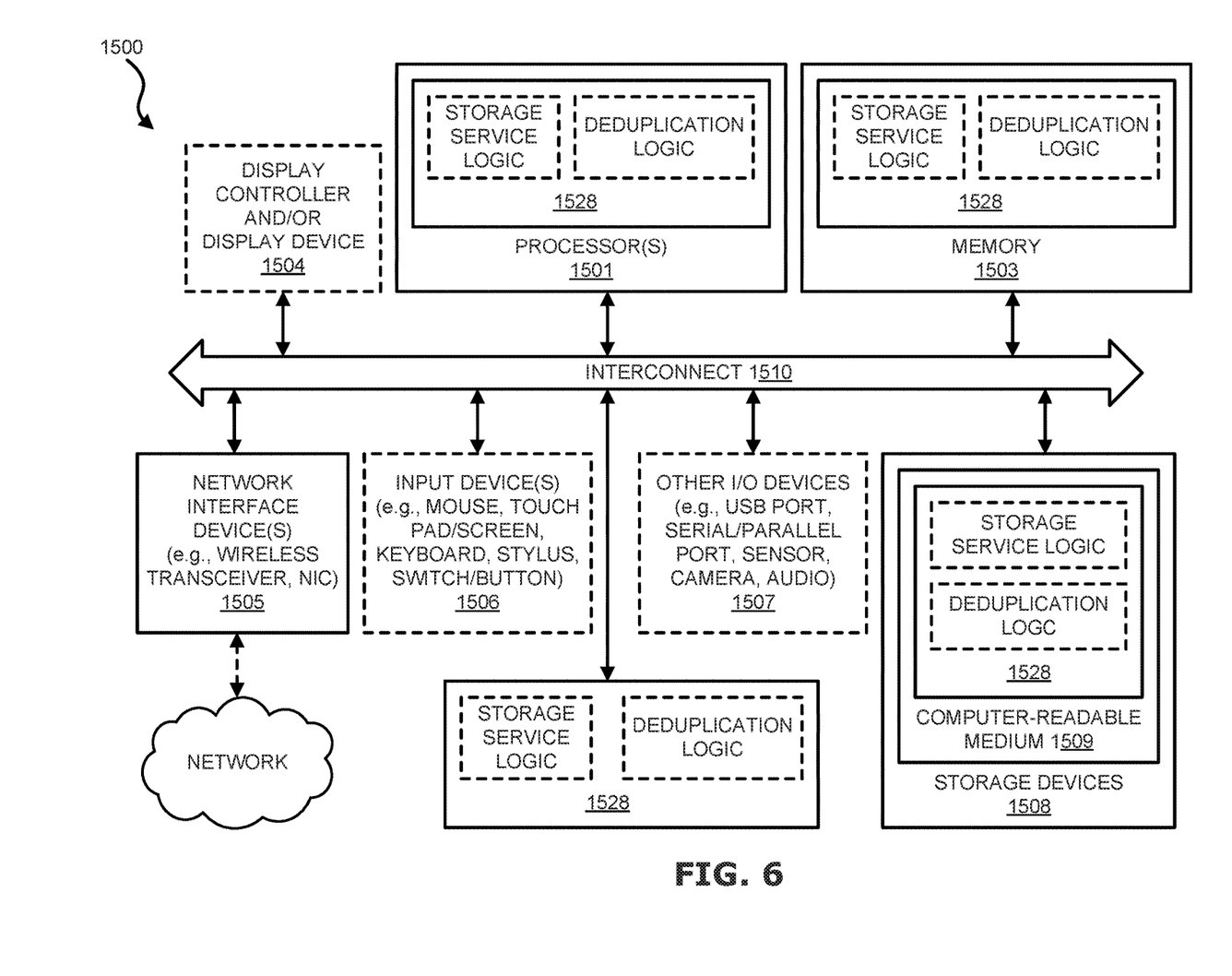
FIG. 6 is a block diagram illustrating an example of a data processing system which may be used with one embodiment of the disclosure.

FIG. 6 is a block diagram illustrating an example of a data processing system 1500 which may be used with one embodiment of the disclosure. For example, system 1500 may represent any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for backing up a virtual disk file using parallel save streams, comprising:
   retrieving a block allocation table (BAT) of the virtual disk file;
   splitting the BAT into a plurality of split BATs;
   assigning data blocks of the virtual disk file to plexes based on the plurality of split BATs, wherein each plex corresponds to one of the plurality of split BATs; and
   streaming the plexes to a backup apparatus in parallel, wherein each plex occupies one stream.

2. The method of claim 1, wherein the BAT specifies physical file offset for each block in the virtual disk file.

3. The method of claim 1, wherein the plexes are equal in size.

4. The method of claim 1, further comprising saving the plexes at the backup apparatus as differencing virtual disk files.

5. The method of claim 4, each plex with the exception of the last plex shares its stream location with the next plex, and each plex with the exception of the parent plex embeds the stream location of the previous plex within its Parent Locator Entry (PLE).

6. The method of claim 4, wherein the differencing virtual disk files on the backup apparatus form a differencing virtual disk file chain.

7. The method of claim 1, wherein the backup apparatus is a deduplicated backup system.

8. A non-transitory machine-readable medium having instructions stored therein which, when executed by a processor, cause the processor to perform backup operations, the operations comprising:
   retrieving a block allocation table (BAT) of a virtual disk file;
   splitting the BAT into a plurality of split BATs;

assigning data blocks of the virtual disk file to plexes based on the plurality of split BATs, wherein each plex corresponds to one of the plurality of split BATs; and streaming the plexes to a backup apparatus in parallel, wherein each plex occupies one stream.

9. The non-transitory machine-readable medium of claim 8, wherein the BAT specifies physical file offset for each block in the virtual disk file.

10. The non-transitory machine-readable medium of claim 8, wherein the plexes are equal in size.

11. The non-transitory machine-readable medium of claim 8, the operations further comprising saving the plexes at the backup apparatus as differencing virtual disk files.

12. The non-transitory machine-readable medium of claim 11, each plex with the exception of the last plex shares its stream location with the next plex, and each plex with the exception of the parent plex embeds the stream location of the previous plex within its Parent Locator Entry (PLE).

13. The non-transitory machine-readable medium of claim 11, wherein the differencing virtual disk files on the backup apparatus form a differencing virtual disk file chain.

14. The non-transitory machine-readable medium of claim 8, wherein the backup apparatus is a deduplicated backup system.

15. A data processing system, comprising:
a processor; and
a memory coupled to the processor storing instructions which, when executed by the processor, cause the processor to perform backup operations, the operations including:

retrieving a block allocation table (BAT) of a virtual disk file;

splitting the BAT into a plurality of split BATs;

assigning data blocks of the virtual disk file to plexes based on the plurality of split BATs, wherein each plex corresponds to one of the plurality of split BATs; and streaming the plexes to a backup apparatus in parallel, wherein each plex occupies one stream.

16. The data processing system of claim 15, wherein the BAT specifies physical file offset for each block in the virtual disk file.

17. The data processing system of claim 15, wherein the plexes are equal in size.

18. The data processing system of claim 15, the operations further comprising saving the plexes at the backup apparatus as differencing virtual disk files.

19. The data processing system of claim 18, each plex with the exception of the last plex shares its stream location with the next plex, and each plex with the exception of the parent plex embeds the stream location of the previous plex within its Parent Locator Entry (PLE).

20. The data processing system of claim 18, wherein the differencing virtual disk files on the backup apparatus form a differencing virtual disk file chain.

21. The data processing system of claim 15, wherein the backup apparatus is a deduplicated backup system.

* * * * *